(12) United States Patent
Earman et al.

(10) Patent No.: US 11,582,336 B1
(45) Date of Patent: Feb. 14, 2023

(54) SYSTEM AND METHOD FOR GENDER BASED AUTHENTICATION OF A CALLER

(71) Applicant: NICE Ltd., Ra'anana (IL)

(72) Inventors: Guy Earman, Pardes Hana (IL); Matan Keret, Oulu (FI); Roman Frenkel, Ashdod (IL)

(73) Assignee: Nice Ltd., Ra'anana (IL)

( * ) Notice: Subject to any disclaimer, the term of this patent is extended or adjusted under 35 U.S.C. 154(b) by 0 days.

(21) Appl. No.: 17/393,977

(22) Filed: Aug. 4, 2021

(51) Int. Cl.
| | |
|---|---|
| *H04M 1/663* | (2006.01) |
| *H04M 3/436* | (2006.01) |
| *G06N 3/02* | (2006.01) |
| *G06K 9/62* | (2022.01) |

(52) U.S. Cl.
CPC .......... *H04M 1/663* (2013.01); *G06K 9/6218* (2013.01); *G06N 3/02* (2013.01); *H04M 3/436* (2013.01); *H04M 2203/6027* (2013.01)

(58) Field of Classification Search
CPC ................. H04M 1/663; H04M 3/436; H04M 2203/6027; G06K 9/6218; G06N 3/02
USPC ......................................................... 455/415
See application file for complete search history.

(56) References Cited

U.S. PATENT DOCUMENTS

| | | | |
|---|---|---|---|
| 8,056,128 B1 | 11/2011 | Dingle et al. | |
| 8,145,562 B2 | 3/2012 | Wasserblat et al. | |
| 8,225,413 B1 | 7/2012 | De et al. | |
| 9,042,867 B2 | 5/2015 | Gomar | |
| 9,620,123 B2 | 4/2017 | Faians et al. | |
| 9,917,833 B2 | 3/2018 | Gomar | |
| 10,110,738 B1 | 10/2018 | Sawant et al. | |
| 10,678,899 B2 | 6/2020 | Keret et al. | |
| 10,854,204 B2 | 12/2020 | Faians et al. | |
| 10,911,600 B1 | 2/2021 | Frenkel et al. | |
| 2004/0249650 A1 | 10/2004 | Freedman et al. | |
| 2006/0285665 A1* | 12/2006 | Wasserblat ......... | G06Q 20/4016 704/E17.002 |
| 2008/0152111 A1* | 6/2008 | Mock ...................... | H04M 3/02 379/142.01 |
| 2008/0195387 A1* | 8/2008 | Zigel ....................... | G10L 17/06 704/E17.007 |
| 2011/0026697 A1* | 2/2011 | Vanier ................. | H04M 3/4878 379/218.01 |
| 2011/0206198 A1 | 8/2011 | Freedman et al. | |
| 2013/0216029 A1 | 8/2013 | Pawlewski | |
| 2015/0055763 A1 | 2/2015 | Guerra et al. | |
| 2015/0142446 A1 | 5/2015 | Gopinnathan et al. | |
| 2015/0269941 A1 | 9/2015 | Jones | |
| 2015/0281446 A1 | 10/2015 | Milstein et al. | |
| 2016/0373891 A1* | 12/2016 | Ramer ................... | H04W 4/024 |
| 2017/0186298 A1* | 6/2017 | Wang ..................... | A61B 5/002 |
| 2018/0032755 A1 | 2/2018 | Odinak | |
| 2018/0082689 A1 | 3/2018 | Khoury et al. | |

(Continued)

OTHER PUBLICATIONS

Glembek, Ondrej, Lukáš Burget, and Pavel Matejka. "Voice Biometry Standard, Draft." *Brno: Speech@ FIT* (2015).

*Primary Examiner* — Binh Kien Tieu
(74) *Attorney, Agent, or Firm* — Pearl Cohen Zedek Latzer Baratz LLP

(57) ABSTRACT

A system and method for authenticating a caller may include receiving an incoming call from the caller, determining a gender of the caller, and selecting, based on the determined gender, to search for the caller in one of: a watchlist of untrustworthy female callers, and a watchlist of untrustworthy male callers.

19 Claims, 4 Drawing Sheets

(56) References Cited

U.S. PATENT DOCUMENTS

| | | |
|---|---|---|
| 2018/0152446 A1 | 5/2018 | Gomar |
| 2019/0037081 A1 | 1/2019 | Rao et al. |
| 2019/0373105 A1 | 12/2019 | Kung et al. |
| 2020/0184979 A1 | 6/2020 | Keret et al. |
| 2020/0250290 A1 | 8/2020 | Keret et al. |
| 2021/0037136 A1 | 2/2021 | Michaeli et al. |
| 2021/0112163 A1 | 4/2021 | Frenkel et al. |
| 2021/0320997 A1* | 10/2021 | Takemura ............ G10L 15/1822 |
| 2021/0353196 A1* | 11/2021 | Liu ...................... A61B 5/4866 |
| 2022/0345570 A1* | 10/2022 | Garg ................... H04L 65/1076 |

* cited by examiner

SYSTEM AND METHOD FOR GENDER BASED AUTHENTICATION OF A CALLER

FIELD OF THE INVENTION

The present invention relates generally to authenticating a caller. More specifically, the present invention relates to authenticating a caller based on a pre-classification, e.g., a gender pre-classification.

BACKGROUND OF THE INVENTION

Call or contact centers need to validate and/or authenticate callers. For example, prior to disclosing sensitive (e.g., medical or financial) information to a caller, an agent needs to be sure that s/he is speaking to the owner of the information, e.g., by authenticating or validating the identity of the caller. For example, voice biometrics (VB) technology is used by call centers in order to authenticate callers. VB is a technology that verifies an identity (e.g., of a caller) based on a recognition of voice patterns which are particular to each individual. For example, in order to verify that a caller is indeed who s/he says s/he is, a VB engine in a call center may match a stored voice print (voiceprint) of a caller with the caller's voice or audio content as captured during a call, if the caller's voice attributes match the stored voice print, then the caller is considered validated and/or authenticated, otherwise, the caller may be considered untrustworthy.

However, current systems and methods suffer from a number of drawbacks. For example, a watchlist including voice prints of known hackers or attackers may be maintained by current or known systems, and an incoming call is matched against the watchlist in order to identify attackers. However, a list of known attackers may be very long, accordingly, matching a call against the watchlist becomes a problem e.g., increasing authentication delay and/or computational requirements.

Another drawback of current and/or known systems and methods relates to accuracy of results, e.g., the accuracy with which systems and methods identify frauds or attacks. As watchlists in which callers are searched for grow bigger, the accuracy with which attackers are identified is decreased since as the number of comparisons done increases, the accuracy of results decreases, at least statistically speaking.

Yet another drawback of current and/or known systems and methods relates to searching for an attacker in recorded calls. For example, calls may be recorded according to (or in association with) an account, e.g., a bank account. In order to search for an attacker who tried to attack a number of accounts, current systems and methods need to match a voice print of the attacker with each of the recorded calls in a system, accordingly, when the number of recorded calls in a system is large (e.g., millions of recorded calls) searching for an attacker in a database may require substantial time and computation resources.

SUMMARY OF THE INVENTION

A system and method for identifying an attempted fraud may include receiving an incoming call from a caller; determining a gender of the caller; and selecting, based on the determined gender, searching for the caller in one of: a first watchlist of untrustworthy female callers and a second watchlist of untrustworthy male callers. In some embodiments, if the caller is found in one of the first and second watchlists then an embodiment may perform at least one action related to fraud detection.

An embodiment may include associating a gender of a caller with each of a plurality of recorded interactions; determining a gender of an untrustworthy caller; and selecting, based on the determined gender of the untrustworthy caller, to search for the untrustworthy caller in recorded interactions in which the gender of the caller is the same as the gender of the untrustworthy caller. In some embodiments, upon identifying the untrustworthy caller in one of the recorded interactions, an embodiment may perform at least one action related to fraud detection.

An embodiment may include associating a gender of a caller with each of a plurality of recorded interactions; and clustering at least some of the recorded interactions by examining recorded interactions associated with a specific gender. The plurality of recorded interactions may include interactions suspected to be related to fraud. An embodiment may include verifying the caller based on matching a determined gender to/with the gender in a retrieved caller data.

An embodiment may include determining the gender of the caller by a unit including a model, the model created by: training a neural network (NN) using an initial set of labeled data and recording results and associated confidence levels produced by the NN; selecting, as labeled data, a set of results such that: a ratio of the number of results related to females to the number of results related to males is within a predefined range, and a majority of confidence levels respectfully associated with a majority of the results in the set are higher than a threshold; and retraining the NN using the selected set.

An embodiment may iteratively select a set of results as labeled data and may retrain an NN until the number of results in the selected set meets at least one criterion. A model may be generated or updated based on recorded interactions of a specific site. An embodiment may determine how to handle an incoming call based on a determined gender. An embodiment may include searching for a caller in one of the first and second watchlists by matching a voiceprint of the caller with voiceprints of the callers in the watchlist.

An embodiment may include calculating a confidence level for a determination of a gender of the caller; and if the confidence level is lower than a threshold then performing at least one of: searching for the caller in first and second lists; and updating a model. An embodiment may include identifying the gender of the caller, if the caller is a male then searching for the caller in a watchlist of untrustworthy male callers, if the caller is a female then searching for the caller in a watchlist of untrustworthy female callers, and, if the caller is found in one of the watchlists then performing at least one action related to security. Other aspects and/or advantages of the present invention are described herein.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not of limitation in the figures of the accompanying drawings, in which like reference numerals indicate corresponding, analogous, or similar elements, and in which:

DETAILED DESCRIPTION OF THE INVENTION

Some embodiments may create a model by training a neural network (or other machine learning unit) to receive an incoming call from a caller and determine a gender of the caller. Based on the determined gender, some embodiments may search for the caller in either a first watchlist of untrustworthy female callers or in a second watchlist of untrustworthy male callers. Accordingly, some embodiments of the invention may generally, or on average, reduce the size of watchlists by half, thus improving speed of operation and efficiency.

Figure 1:
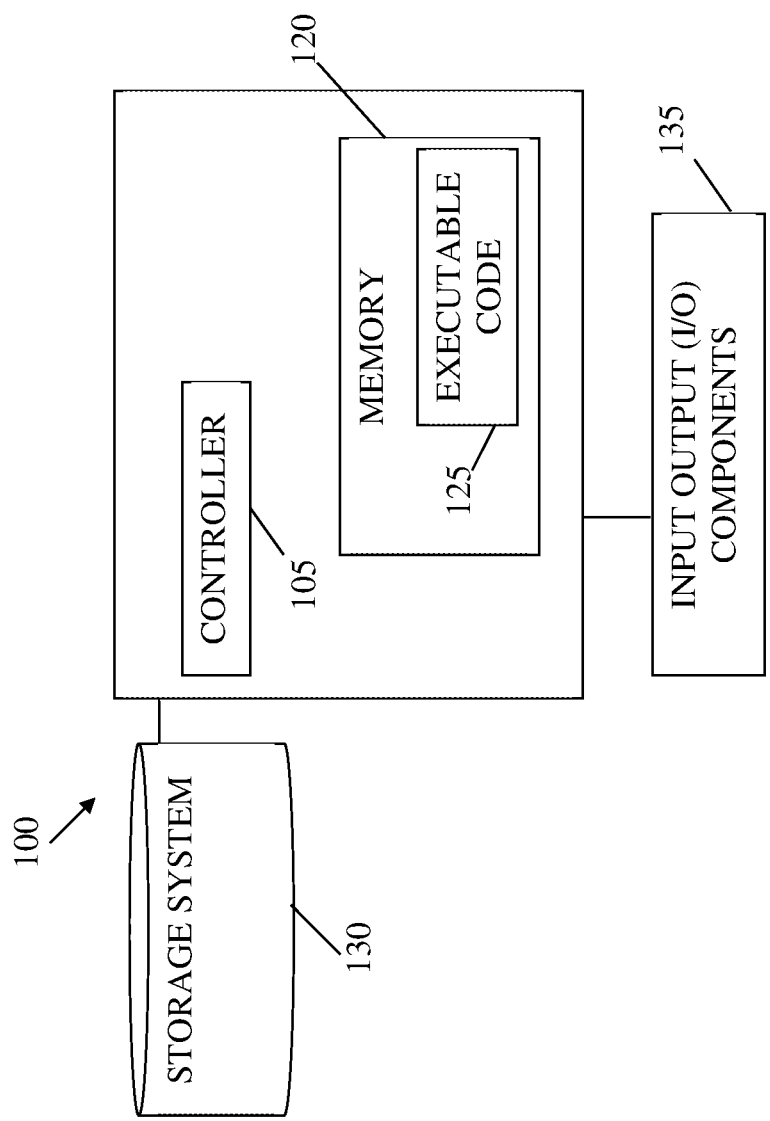
FIG. 1 shows a block diagram of a computing device according to illustrative embodiments of the present invention.

Reference is made to FIG. 1, showing a non-limiting, block diagram of a computing device or system 100 that may be used to authenticate or verify entities or validate identities of callers according to some embodiments of the present invention. Computing device 100 may include a controller 105 that may be a hardware controller. For example, computer hardware processor or hardware controller 105 may be, or may include a central processing unit processor (CPU), a chip or any suitable computing or computational device. Computing system 100 may include a memory 120, executable code 125, a storage system 130 and input/output (I/O) components 135. Controller 105 (or one or more controllers or processors, possibly across multiple units or devices) may be configured (e.g., by executing software or code) to carry out methods described herein, and/or to execute or act as the various modules, units, etc., for example by executing software or by using dedicated circuitry. More than one computing devices 100 may be included in, and one or more computing devices 100 may be, or act as the components of, a system according to some embodiments of the invention.

Memory 120 may be a hardware memory. For example, memory 120 may be, or may include machine-readable media for storing software e.g., a Random-Access Memory (RAM), a read only memory (ROM), a memory chip, a Flash memory, a volatile and/or non-volatile memory, a cache memory, a buffer, a short-term memory unit, a long term memory unit, or any other suitable memory units or storage units. Memory 120 may be or may include a plurality of, possibly different memory units. Memory 120 may be a computer or processor non-transitory readable medium, or a computer non-transitory storage medium, e.g., a RAM. Some embodiments may include a non-transitory storage medium having stored thereon instructions which when executed cause the processor to carry out methods disclosed herein.

As referred to herein, "a controller" or "a processor" carrying out a function or set of functions can include one or more such controllers or processors, possibly in different computers, doing so. Accordingly, it will be understood that any function or operation described as performed by a controller 105 may be carried by a set of two or more controllers in possibly respectively two or more computing devices. For example, In an embodiment, when the instructions stored in one or more memories 120 are executed by one or more controllers 105 they cause the one or more controllers 105 to carry out methods of authenticating or validating a caller as described herein. For example, controller 105 may execute code to act as a gender determination unit, a neural network (NN) unit, or another unit or module as discussed herein.

Figure 2:
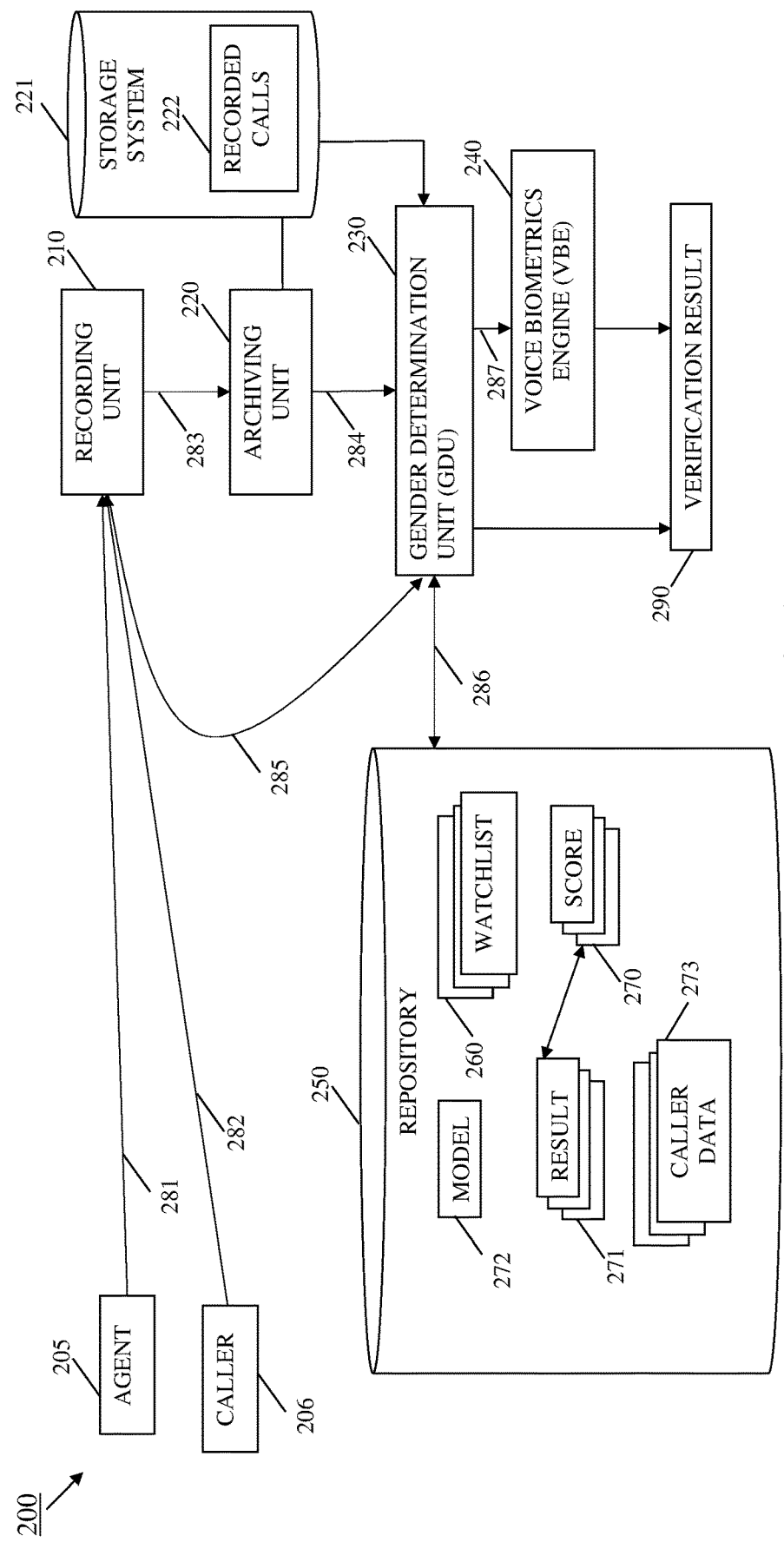
FIG. 2 shows an overview of a system and flows according to illustrative embodiments of the present invention.

More than one computing device 100 may be included, and one or more computing devices 100 may act as the various components, for example the components of system 200 such as gender determination unit (GDU) 230, voice biometric engine (VBE) 240 and archiving unit 220 shown in FIG. 2 (and further described herein) may each include a controller 105, a memory 120 and executable code 125.

Executable code 125 may be an application, a program, a process, task or script. A program, application or software as referred to herein may be any type of instructions, e.g., firmware, middleware, microcode, hardware description language etc. that, when executed by one or more hardware processors or controllers 105, cause a processing system or device (e.g., system 100) to perform the various functions described herein.

Executable code 125 may be executed by controller 105 possibly under control of an operating system. For example, executable code 125 may be an application that determines a gender of a caller, e.g., included in GDU 230 shown in FIG. 2 and as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein.

Computing device or system 100 may include an operating system (OS) that may be code (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system. Accordingly, units included in computing device or system 100 may cooperate, work together, share information and/or otherwise communicate.

Storage system 130 may be or may include, for example, a database, a hard disk drive, a disk array, a recordable media, a universal serial bus (USB) device or any other suitable, long-term storage system that may be removable and/or fixed storage unit.

I/O components 135 may be, may include, or may be used for connecting (e.g., via included ports): a mouse; a keyboard; a touch screen or pad or any suitable input device. I/O components may include one or more screens, touchscreens, displays or monitors, speakers and/or any other suitable output devices. Any applicable I/O components may be connected to computing device 100 as shown by I/O components 135, for example, a wired or wireless network interface card (NIC), a universal serial bus (USB) device or an external hard drive may be included in I/O components 135.

A system according to some embodiments of the invention may include components such as, but not limited to, a plurality of central processing units (CPU) or any other suitable multi-purpose or specific processors, controllers, microprocessors, microcontrollers, field programmable gate arrays (FPGAs), programmable logic devices (PLDs) or application-specific integrated circuits (ASIC). A system according to some embodiments of the invention may include a plurality of input units, a plurality of output units, a plurality of memory units, and a plurality of storage units. A system may additionally include other suitable hardware components and/or software components. In some embodiments, a system may include or may be, for example, a workstation, a server computer, a network device, or any other suitable computing device.

Reference is made to FIG. 2, an overview of a system 200 and flows according to some embodiments of the present invention. The various units or modules of FIG. 2 may be embodied as one or more computer systems such as shown in FIG. 1. As shown, system 200 may include a recording unit 210, an archiving unit 220 connected to a storage system 221 which may include recorded calls or voiceprints 222. Storage system 221 may include components of, and/or it may be similar to, storage system 130. As further shown, system 200 may include a gender determination unit (GDU) 230, a voice biometrics engine (VBE) 240 and a repository 250. As shown, repository 250 may include caller data 273, watchlists 260, results 271 and scores 270 (collectively referred to hereinafter as watchlists 260, results 271 and/or scores 270 or individually as a watchlist 260 a result 271 and/or a score 270, merely for simplicity purposes). GDU 230 may include a controller 105, a memory 120 and executable code 125, similarly, recording unit 210, archiving unit 220 and VBE 240 may include a controller 105, memory 120 and executable code 125. GDU 230 may include, or be a model generated by training a neural network (NN), e.g., a Convolutional Neural Network (CNN) etc. For example, upon powering up system 200 or GDU 230, model 272 stored in repository 250 may be loaded into a memory 120 of GDU 230 and may govern logic applied by GDU 230. Thus a model such as model 272 may be, or be included in, an NN or CNN, which is a computer construct including layers of neurons or nodes, each neuron connected by links to neurons in other layers. For the sake of simplicity and clarity, in order to avoid showing two sets of results and scores, results 271 and their associated scores 270 may be results and scores produced by an NN during training and, in other cases, results 271 and their associated scores 270 may be results and scores produced, e.g., in realtime, by GDU 230 when processing audio data of caller 206.

Watchlists 260, caller data 273, scores 270, results 271 and model 272 may be any suitable digital data structure, construct or computer data objects that can be stored and/or modified in repository 250, and/or can be retrieved from repository 250. For example, watchlists 260, scores 270, results 271 and model 272 may be, or may be included in, files, e.g., files included in a database in repository 250. Generally, a first score 270 may be associated with a first result 271 and a second, different score 270 may be associated with a second, different result 271. For example, association of scores 270 with results 271 may be done using a table in which each entry includes a reference to (or identification of) a result 271 and a reference to (or identification of) an associated score 270. In some embodiments, a score 270 may be included in a result 271, e.g., such that when a result 271 is retrieved from repository 250 (e.g., by GDU 230) its score 270 is also retrieved and thus made available.

Content, e.g., scores 270 and results 271 may be loaded from repository 250 into a memory 120 included in GDU 230 where it may be processed by controller 105 included in GDU 230. For example, a score 270 and a result 271 may be loaded into a memory 120 of GDU 230 and used for generating labeled data as further described.

Caller 206 may be a person calling a call center. For the sake of simplicity, as referred to herein, caller 206 may also be considered a device (e.g., a telephone or smartphone) used by that person, customer, or other entity calling a call center, and agent 205 may be an agent in a call center and the device used by the agent to speak with the calling entity. Data carried from caller 206 and agent 205 as shown by arrows 281 and 282 may represent speech of the caller and the agent and may be compressed or uncompressed audio codec payload, e.g., formatted according to μ-law (mu-law), a well-known in the art version of the G.711 standard.

Generally, recording unit 210 is viewed in this description as an entry point of audio data, that is, the first, or earliest point in a system wherefrom audio data received from caller 206 can be distributed or forwarded to other entities in a system. It will be understood that in some embodiments, other units may receive audio data as shown by arrows 281 and 282 and such other units may provide audio data to archiving unit 220 and/or GDU 230.

Recording unit 210 may utilize a codec (e.g., a codec known in the art as G729, which synthesizes human voice signal for audio data compression) to compress data received as shown by arrows 281 and 282 and, recording unit 210 may pass or provide the (compressed or uncompressed) audio data to archiving unit 220 (as shown by arrow 283) which may archive the audio data in storage system 221 as shown by recoded calls or voiceprints 222.

The audio data produced by recording unit 210 may be passed or provided to GDU 230 as shown by arrow 284. It is noted that the compressed data may be provided to GDU 230 from (or via) archiving unit 220 or directly from recording unit 210 (the direct path from recording unit 210 to GDU 230 is not shown for simplicity). In yet other embodiments, GDU 230 may retrieve compressed or other audio data produced by recording unit 210 from storage system 221, e.g., instead of receiving audio data from recording unit 210 or from archiving unit 220, GDU 230 may use access to storage system 221 to obtain audio data in recorded calls 222.

In some embodiments, when caller 206 calls a call center, the caller's audio signal may be provided to recording unit 210 as described and, in addition, at the same time or in parallel, as shown by arrow 285, the audio content may be provided to GDU 230 (e.g., by recording unit 210 or by another unit). For example, audio data carried as shown by arrow 285 may be provided to GDU 230 (as illustrated by arrow 285) in Realtime, immediately upon establishment of a call and while the call is in progress. Audio data or signal provided to GDU 230 as shown by arrow 285 may be compressed audio signal or it may be raw, uncompressed data, e.g., recording unit 210 may compress or process received audio data and forward the processed audio data as shown by arrow 285 or recording unit 210 may pass or forward raw audio data to GDU 230, e.g., as received, untouched and/or unprocessed.

A voiceprint as referred to herein and in the art may be information that characterizes the voice of a specific person, that is, a voiceprint may be an individually distinctive pattern of certain voice characteristics. For example, using a spectrograph, wavelengths specific to an individual may be identified and stored in a voiceprint. Accordingly, a voiceprint may be considered as an identification (ID) of a caller.

An untrustworthy caller as referred to herein may be any caller marked as untrustworthy. For example, having identified fraudulent activity, the hacker (caller) involved may be marked as untrustworthy and any information related to the hacker may be stored. Marking a caller as untrustworthy may include recording any information, e.g., the name of the caller (hacker), the gender of the caller, the origin (calling) number, a voiceprint of the hacker and the like. Marking a caller as untrustworthy may include including the caller in one or more lists, databases or watchlists 260.

Watchlists or lists 260 may include details of untrustworthy callers, e.g., a watchlist 260 may include a set or list of attackers, e.g. identities of attackers or pointers to attackers' data records. Watchlists 260 may include, or they may include references or pointers to, information of, or related to, untrustworthy callers, e.g., known hackers. For example, a watchlist 260 may include (or may include reference or pointer to a location of) a (source or calling) number of an untrustworthy caller, a name or other identifier, a gender, a pointer or reference to caller data 273 which includes additional information related to the untrustworthy caller and/or a pointer or reference to a recorded call 222 in which the untrustworthy caller participated.

Caller data 273 may include any information related to callers. For example, caller data 273 may include, for each of a plurality of callers, a voiceprint of the caller, a (source or calling) phone number, dates the caller called a facility (e.g., a bank, a call center etc.) and so on. Caller data 270 may include any records, lists or any form of information enabling retrieval of information related to a caller. In some embodiments, caller data 273 may include a gender. For example, an embodiment may (e.g., in offline or during enrollment) process recorded calls 222, voiceprints and/or metadata related to callers, determine the gender of callers and include a gender in some, or even all of the records in caller data 273 such that the known gender of a caller may be quickly retrieved and made known during operation.

As described, a watchlist 260 may include, for a specific untrustworthy caller, a pointer or reference to the relevant (or related) caller data 273. Accordingly, caller data records may be associated with entries in a watchlist 260.

Results 271 may be produced by an NN when trained. For example, a result may indicate successful or unsuccessful identification of a gender of a caller where success or failure are determined using labeled data.

Scores 270 may be produced by an NN when trained. For example, during training, an NN may generate a result 271 and associate the result 271 with a score 270 which indicates the level of confidence the NN has in the result, or simply explained, a score 270 indicates how accurate the NN thinks its decision is. For example, a score 270 may be calculated using a loss function.

Scores 270 may be produced by a unit including a model (e.g., model 272) generated by training an NN, e.g., GDU 230. For example, provided with audio data of caller 206, GDU 230 may process the data using model 272 (which may be loaded into a memory 120 of GDU 230), produce a result 271 (e.g., the caller is a male) and further produce a score 270 for the result indicating a level of confidence GDU 230 has in its decision or result. For example, a score 270 may be a number between zero and one (0-1) where zero indicates completer lack of confidence and one indicates full confidence.

Verification result 290 may include a simple indication of whether or not the caller is verified, authenticated or validated. For example, verification result 290 may include a Yes/No value, e.g., in the form of zero or one (I/O) where one means the caller authenticated, that is, the caller is indeed who s/he says s/he is (authenticated) and zero means the caller could not be authenticated and/or the caller is not the expected caller.

In some embodiments, verification result 290 may include any number or value within a range and an embodiment may select a course of action based on relating the value in verification result to one or more thresholds. For example, a low threshold of 0.37 and a high threshold of 0.86 may be used such that if verification result 290 includes a value of 0.29 a mismatch is determined, if the value in verification result 290 is between, or in the range of the two thresholds (e.g., between 0.37 and 0.86) then verification result 290 is considered inconclusive, and, for example, an embodiment may select to trigger VBE 240 into action, and, if verification result 290 includes a value higher than 0.86 then an embodiment may determine a match is found between the gender of the caller and an expected (recorded) gender. As further described, scores produced by GDU 230 may be similarly used, e.g., in order to determine a mismatch, an inconclusive result or a match.

As described, an embodiment (e.g., GDU 230) may find caller 206 in one of watchlists 260 and thus determine the call is an attack, in such case GDU 230 may (as illustrated by the arrow connecting GDU 230 with verification result 290) produce a verification result 290 which indicates the caller was not authenticated. In some embodiments, if the gender of caller 206 does not match (is not the same as) the recorded gender of caller 206 then an embodiment, e.g., GDU 230, may generate verification result 290 which may indicate the caller was not authenticated, e.g., a mismatch was found, or an inconclusive result was identified as described.

In some embodiment, GDU 230 may produce verification result 290 based on a score. For example, using model 272, GDU 230 may process audio data received as shown by arrow 285, determine that caller 206 is a male (result 271) with a confidence level of 0.89 (score 270). GDU 230 may further match the determined gender with the gender in caller data 273 of caller 206 and, since the confidence level is above the threshold (e.g., 0.65), GDU 230 may bypass VBE 240 and provide verification result 290. In another case, e.g., if the confidence level is below the threshold, e.g., it is 0.38, GDU may pass any input (e.g., the audio data received and/or result 271 and/or score 270) to VBE 240 as illustrated by arrow 287. VBE 240 may process the call, e.g., match voiceprints of caller 206 and a recorded voiceprint and may produce verification result 290.

Accordingly, some embodiments may determine a call is suspicious, or a call is an attack, without having to use a VB engine, e.g., GDU 230 may identify an attack without involving VBE 240. As known in the art, processing data by a VB engine is costly both in time and resources, in contrast, determining, on-the-fly, in Realtime, a gender of a caller and matching the gender with a gender in caller data 273 requires minimal resources and can be done in realtime with minor impact on speed.

Moreover, as known in the art, the longer a list being searched, the longer it takes to search the list. More importantly, the longer a list being searched, the higher the error rate. Watchlists 260 may be of substantial size since information related to attackers is gathered in various ways and/or is shared among entities, e.g., information related to attackers may be shared between banks, governments and the like.

In some embodiments, watchlists 260 may be class based. For example, a class of gender may be used, that is, a first watchlist 260 may include male attackers and a second watchlist 260 may include female attackers. By first determining a gender of caller 206, some embodiments of the invention need to search only one of the two (male/female) watchlists 260. Accordingly, some embodiments of the invention reduce the size of lists being searched, thus improving both speed and accuracy of a system and method. For example, assuming an even gender distribution of attackers, an embodiment of the invention cuts the size of the searched list in half, that is, at the minor cost of determining the gender of caller 206, an embodiment needs to search for the caller in one of a first or second lists which are half the size of the list of all (female and male) attackers. As discussed, by reducing the size of a list being searched, accuracy is increased as well as speed of operation of a system, accordingly, embodiments of the invention improve the field by increasing accuracy, reducing time and/or reducing the computational requirements.

In some embodiments, a method of identifying an attempted fraud may include receiving an incoming call from a caller; determining a gender of the caller; and, selecting, based on the determined gender, to search for the caller in one of: a first watchlist of untrustworthy female callers and a second watchlist of untrustworthy male callers. For example, a call from caller 206 may be routed to GDU 230, e.g., either directly, as shown by arrow 285 or via archiving unit 220 as shown by arrow 284. GDU 230 may, using model 272, determine the gender of caller 206 and, based on the determined gender, select to search a watchlist 260 which includes callers of the same gender as caller 206. Accordingly, if the caller is a female, in order to determine whether or not the caller is a hacker, an embodiment needs to search in a watchlist 260 of females and not a (possibly twice the size) list of all known hackers or untrustworthy callers.

In some embodiments, a method of authenticating a caller may include identifying the gender of the caller, and, if the caller is a male then searching for the caller in a watchlist of untrustworthy male callers, else, if the caller is a female then searching for the caller in a watchlist of untrustworthy female callers. If the caller is found in one of the watchlists, some embodiments may perform at least one action related to security, e.g., alert a user. As described, identifying the gender of a caller (e.g., the gender of caller 206) may be done in realtime. Although gender as used herein mainly refers to biological gender, that is, either males or females, in some embodiments a gender may be one or more attributes other than male or female, for example, in addition to the two female/male genders, some embodiments may treat synthesized audio as a third gender, recorded audio as a fourth gender and so on. Of course, GDU 230 may readily identify or determine, as described, the gender of a speaker in a recorded message, synthesized voice or other audio content. While the example embodiments described use male and female as genders of the people categorized (e.g. a binary system), other genders of people and other numbers of genders of people may be used. If more than two genders are used, more than two watchlists are used.

In some embodiments, if a caller is found in one of the watchlists searched as described, then an embodiment may perform at least one action related to fraud detection and/or prevention. For example, an embodiment, e.g., GDU 230 or another entity receiving an alert from GDU 230, may, upon finding caller 206 in a watchlist 260, sound an alarm, send an electronic mail (email) to a list of recipients, popup a message on an administrator screen and so on. If caller 206 is not found in any watchlist 260 then an embodiment may perform additional verification or authentication actions, e.g., VBE 240 may verify caller 260 (e.g., against a voiceprint) or GDU 230 may match its determined gender against a gender recorded in caller data 273.

Various authentication and/or attack prevention flows may be enabled and employed by embodiments of the invention. For example, a fast process or flow may include two basic steps of: checking watchlists and verifying gender. For example, a specially fast authentication and/or attack prevention flow may include determining the gender of caller 206, verifying caller 206 is not included in a gender-specific watchlists 260, and matching the gender of caller 206 with a gender recorded in caller data 273 of caller 206. That is, if a caller is not in a watchlist 260 and its determined (by GDU 230) matches its recorded gender then an embodiment may determine the caller is verified or authenticated.

Stricter flows may involve VBE 240. For example, if any of the steps performed by GDU 230 in the above example fast flow fails, e.g., a gender mismatch is detected when comparing the gender of caller 206 as determined by GDU 230 and a recorded gender of caller 206, then processing may be passed on to VBE 240 which may authenticate caller 206 by comparing a voiceprint of caller 206 to a recorded voiceprint of caller 206.

An even stricter flow may employ GDU 230 and VBE 240 in sequence, and caller 206 may be considered authenticated only if both these entities determine caller 206 is authenticated. Other flows or configurations may be contemplated. For example, in some embodiment, caller 206 may be considered authenticated if authenticated by VBE 240 even though GDU 230 indicates a gender mismatch. For example, and as further described, GDU 230 may, in addition to producing a determined gender, produce and provide a score 270 rating the accuracy (level of confidence) of the determination. In some embodiments, if the determination score 270 is below a threshold, an embodiment may ignore a gender mismatch if VBE 240 indicates the caller is authenticated.

An attacker typically attacks more than one account. For example, an attacker typically attacks (many) different email accounts, different bank accounts, or different users registered at a website. Accordingly, it may be necessary or helpful to search for an attacker in recorded interactions with a bank, website or call center. Prior art systems and methods may obtain identification of a hacker, e.g., a voiceprint and may search for the hacker in generally all stored or recorded interactions, e.g., in recorded calls 222. As the number of recorded calls 222 may be huge, the task of searching for a hacker may be overwhelming. Some embodiments of the invention may improve the field by drastically reducing the number of recorded interactions that need to be examined in order to find the ones in which a specific hacker is involved.

In some embodiments, a method may include associating a gender of a caller with each of a plurality of recorded interactions; determining a gender of an untrustworthy caller; and selecting, based on the determined gender of the untrustworthy caller, to search for the untrustworthy caller in recorded interactions in which the gender of the caller is same as the gender of the untrustworthy caller. For example, some or even all of, recorded calls 222 may be associated with (and/or made to include) a gender value (gender for short). For example, the value of zero ("0") may indicate male and a value of one ("1") may indicate female and some or all of recorded calls 222 may be associated with (or made to include) either one or zero based on the gender of the caller. The gender of callers in recorded calls 222 may be received, obtained, known or determined in various ways. For example, the gender may be included in metadata of callers, e.g., along side other biometric information such as name, address and the like, accordingly, embodiments of the invention may determine the gender of callers by examining metadata of callers in recorded calls 222 and may include or associate a gender with recorded calls. Associating a gender with recorded calls 222 may be an offline process, e.g., an ongoing process done in the background with the goal of associating all recorded calls 222 with a gender.

Associating a gender with a recorded call may include, for example, including a gender value in a first entry in a row of list and including, in a second entry in the same row, a pointer to the location of the recorded call in storage system 221. In other cases, an association list may include database keys or any other information enabling quickly and readily determining a gender of a recorded call. In yet other cases, associating a recorded call with a gender may be achieved using pointers, or it may be including in, or adding to a recorded call, a gender value. Similarly, such methods and lists may be used for associating scores 270 with results 271. Associating gender with recorded calls 222 may include generating two lists, one list including (or pointing to) recorded calls in which the caller is a female and another list pointing to recorded calls in which the caller is a male.

An embodiment may determine or receive the gender of a specific hacker (untrustworthy caller). For example, a user (or service) may report details of a hacker, by providing metadata (e.g., name, phone number, gender and the like) and/or providing a recording of the hacker. Using metadata of a hacker and/or by processing a recording of the hacker, GDU 230 may determine that the hacker is a female. Having associated recorded calls 222 with a gender, and possibly generating a list of recorded calls 222 of female callers, an embodiment may quickly and efficiently search for the hacker by ignoring recorded calls 222 in which the caller is a male and only examine calls in which the caller is a female. Accordingly, the number of recorded calls that need to be examined is drastically reduced thus increasing both speed of operation and accuracy of a result.

In some embodiments, upon identifying the untrustworthy caller in one of the recorded interactions, an embodiment may perform at least one action related to fraud detection. For example, upon identifying a specific hacker in the caller in one of recorded calls 222, an embodiment, e.g., GDU 230, may alert a user, sound an alarm, send an email to a list of recipients, popup a message on an administrator screen and so on. If the hacker is not found in any of recorded calls 222 then an embodiment may inform a user that the hacker was not found.

Some embodiments may cluster recorded calls 222. For example, clustering may include grouping or association together of all recorded calls in which the caller is the same person. For example, since an attacker typically attacks a large number of accounts by a respective large number of calls, clustering calls by caller can help in identifying attacks. Generally, clustering may include examining some, or even all of recorded calls 222 in order to identify calls having the same caller, accordingly, for prior art systems and methods, clustering is an expensive, costly task. Some embodiments of the invention improve the technology by drastically reducing the number of recorded calls 222 that need to be examined in order to cluster recorded calls according to callers.

Some embodiments may cluster at least some of the recorded interactions in a system by examining recorded interactions associated with a specific gender while ignoring, or avoiding from examining recorded interactions associated with any other gender. For example, having generated (possibly separated) lists of recorded calls 222 for male and female callers, in order to cluster recorded calls 222, an embodiment may first examine, and attempt to cluster, calls from male callers while ignoring calls from female callers. In a similar way (by ignoring male callers), GDU 230 may cluster recorded calls 222 involving a female caller. Accordingly, using gender based clustering, the number of recorded calls 222 that need to be examined may be sharply reduced thus increasing speed and accuracy.

Recorded calls in a cluster of recorded calls may be treated as a potential indication of an attack or fraudulent event or activity. For example, a large cluster of calls (all having the same caller) in which different accounts are discussed may be a strong indication of a hacker attacking different accounts. Accordingly, an embodiment may examine clusters and report or alert a user, e.g., if a cluster includes more than a threshold number of calls, if more than a threshold number of accounts are discussed in the same cluster and so on.

As described, some embodiments may identify attacks and/or authenticate callers. For example, when a call comes in, e.g., to a call center, other than determining whether or not the call is (or is related to) an attack, it may be beneficial to authenticate the caller, e.g., prior to providing sensitive information. Some embodiments may verify an identity of a caller (authenticate the caller) by matching the gender determined by GDU 230 to a gender in a retrieved caller data 273 record. For example, GDU 230 may determine the gender of caller 206 based on audio data (e.g., provided as shown by arrow 284 or by arrow 285), retrieve caller data 273 of caller 206 (e.g., using the phone number as a search key in a database) and match or compare the determined gender with a gender in caller data 273. If a mismatch is found, that is, the gender in caller data 273 is not the same as the gender determined by GDU 230 then GDU 230 may generate and provide verification result 290 indicating the caller is not (or cannot be) authenticated. It is noted that if a mismatch is found then there is no need to involve (costly) VBE 240 in the authentication process, accordingly, by bypassing a VB engine, embodiments of the invention can increase speed of operation thus further improving technological fields such as security, user authentication, contact centers and other fields. In some embodiments, if a match is found by GDU 230 then processing may be passed to VBE 240 which may perform additional verification or authentication, e.g., match a voiceprint of caller 206 with a voiceprint stored in storage system 221 or in repository 250.

As described, an embodiment, e.g., GDU 230, may include a model, e.g., model 272 which may be loaded into a memory 120 of GDU 230. In some embodiments, model 272 may be created by training an NN using an initial set of labeled data and recording results and associated confidence levels (scores 270) produced by the NN; selecting, as labeled data, a set of results such that: a ratio of the number of results related to females to the number of results related to males is within a predefined range, and such that a majority of confidence levels respectfully associated with a majority of the results in the set are higher than a threshold; and retraining the NN using the selected set. For example, labeled data may be or may include a set (or subset) of recorded calls 222 and, for each of the recorded calls, an indication of the (known) gender of the caller. For example, an indication of the gender of a caller in a set of labeled data may come from a user or it may come from metadata associated with the recorded calls. Accordingly, labeled data may be used in order to train an NN, that is, since the gender of a recorded call in a set of labeled data (or labeled recorded calls) is known, an embodiment can determine whether or not an NN (when trained) has correctly identified the gender in the recorded call, check the score associated with a prediction or determination produced by the NN when trained and modify a model in the NN, e.g., such that the NN correctly identifies the gender in a subsequent training run and/or produces a higher score or confidence level when processing the call in a following training run, cycle or iteration.

Some embodiments may iteratively select a set of results as labeled data and retrain an NN until the number of results in the selected set meets at least one criterion and/or until the ratio between male and female callers meets a criterion. For example, the process of training an NN, recording results and scores, selecting a set of high scored results in which the ratio of male to female callers is within a predefined range may be an iterative process which may be repeated until one or more threshold or criterion are met.

An initial set of labeled data may be obtained and/or created using metadata related to recorded calls. For example, each of some, or even all of, recorded calls 222 may have, or may be associated with, a caller data 273 record or object and, in some of the caller data 273 records, the gender of the caller may be indicated, and the call may be labelled with that gender data in the associated caller data. Accordingly, labeled data, that is, recorded calls 222 for which the caller's gender is known can be created or obtained. In other embodiments, an initial set of labeled data may be created. For example, an initial, default or untrained gender recognition model may be loaded into a memory of GDU 230 (acting as an NN being trained) and the initial model may be used to process a (typically large) number of recorded calls 222, determine the caller's gender therein (e.g., in the form of a result 271) and provide a score (e.g., a score 270). The results and scores produced may be recorded and examined and a subset of results may be selected as labeled data, e.g., results associated with a score higher than 0.82 (or other score-threshold) may be selected, or used, as the initial set of labeled data.

Figure 3:
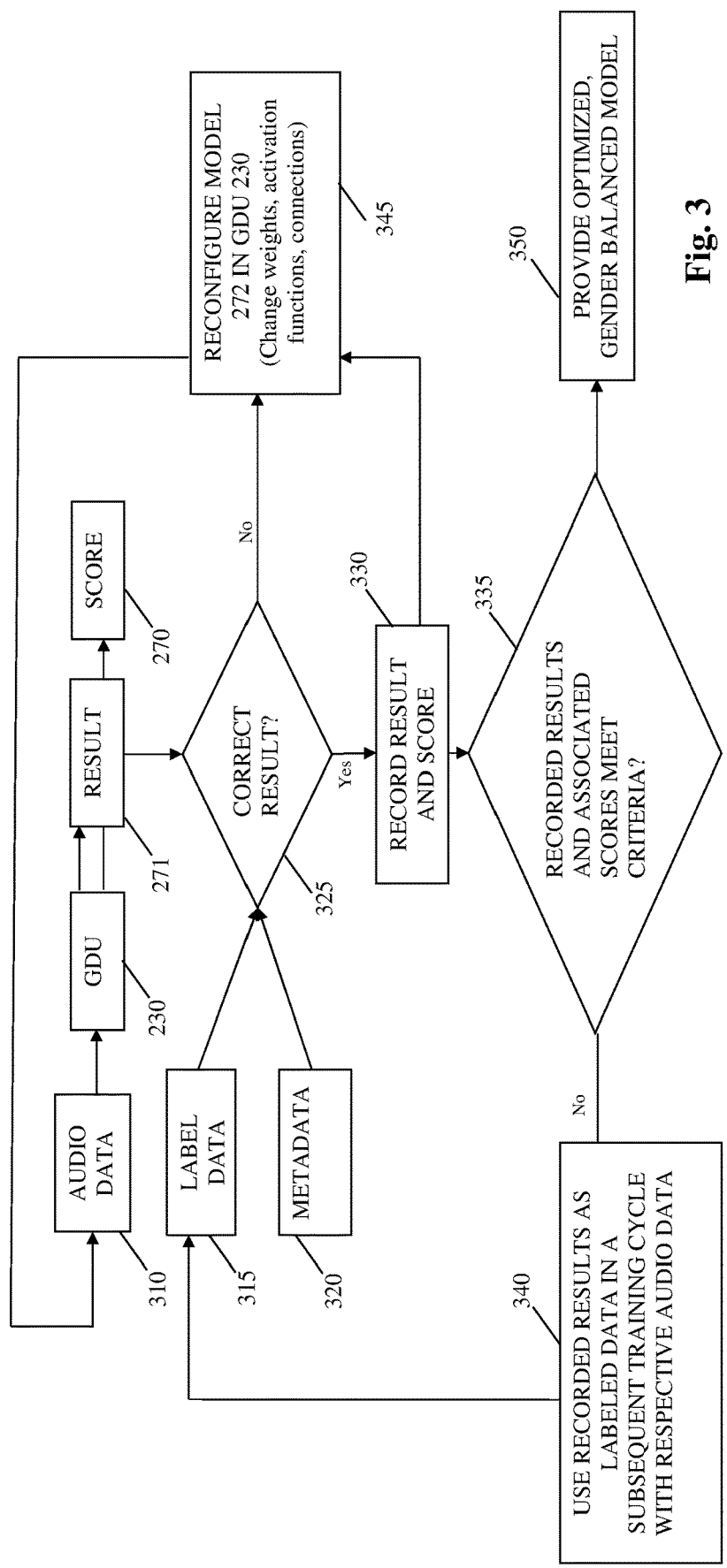
FIG. 3 shows a system and flows of a method of training a neural network according to illustrative embodiments of the present invention.

Reference is made to FIG. 3, a system and flows of a method of training a neural network according to illustrative embodiments of the present invention. In some embodiments, GDU 230 (which may include a model 272) may be an operational unit in a system (e.g., as shown in FIG. 2) and, at other times, cases or embodiments, GDU 230 may be, act or function as, an NN being trained, accordingly, and for the sake of simplicity, GDU 230 is shown in FIG. 3 as an NN being trained.

As shown by block 310, audio data may be provided to GDU 230 which may produce a result 271 and a score 270 of, or associated with, the result 271. For example, during training, audio data 310 may be or include some of recorded calls 222.

As shown by block 325, training may include checking whether or not result 270 is correct. For example, using label data 315 which may indicate, per recorded call 222 whether the caller is a male or a female. Alternatively or additionally, checking or determining whether result 271 is correct may be done using metadata 320, e.g., obtained as described, where metadata 320 may be associated with audio data 310, indicate, per each recorded call 222, the gender of the caller.

Training an NN may be an iterative process in which recorded calls 222 are fed, one after the other, to GDU 230. As shown by block 345, if the result (of processing a first recorded call 222) is incorrect (e.g., GDU 230 determined that the caller is a male but either label data 315 or metadata 320 indicate the caller is a female) then model 272 in GDU 230 may be modified and/or reconfigured, e.g., such that a loss function is minimized. For example, weights of connections between neurons (nodes) in model 272 may be changed, activation functions may be reconfigured and connections between neurons may be set or removed. As shown by the arrow connecting blocks 345 and 310, following a modification of a model, a subsequent iteration may be performed, e.g., using a second, subsequent or next recorded call 222 as audio data 310.

As shown by block 330, if the result or prediction of GDU 230 is correct (e.g., the gender GDU 230 indicates or predicts is same as indicated by label data 315 and/or metadata 320) then an embodiment may record result 270, score 271 and additional information, e.g., a pointer or reference to the relevant recorded call 222, e.g., such that the recorded call 222 can be used in a subsequent or following training run or iteration as described. As shown by the arrow connecting blocks 330 and 345, even if a result produced by GDU 230 is correct, an embodiment may modify model 272 in GDU 230, e.g., such that the score 270 that will be produced by GDU 230 when processing the recorded call 222 in a subsequent iteration is increased.

As shown by block 335, possibly following a recording of a correct result and score, an embodiment may check whether or not the set of recorded results and scores meets one or more rule, threshold and/or criterion. Rules, thresholds and/or criteria against which a set of results and their scores are further described herein.

As shown by block 350, if the set of recorded results and scores meets one or more rules, threshold and/or criterion then an embodiment may determine that model 272 in GDU 230 is an optimized and gender-wise balanced model and may provide model 272, e.g., store the model in repository 250 or in storage system 221.

As shown by block 340, if the set of recorded results and scores meets one or more rules, threshold and/or criterion then an embodiment may select a subset from the set and use the selected subset for a next, or subsequent training run, training iteration or training cycle. For example, a training run, iteration or cycle may include causing GDU 230 to process a set (or subset) of recorded calls 222 using respective or relevant metadata 320 or label data 315.

For example, generating model 272 may start with a standard, initial (e.g., off the shelf or commercial) gender detection model which may be trained using customer data, e.g., recorded calls 222 may be stored at a customer site or storage, and a standard or initial model may be trained using some of recorded calls 222. For example, when trained, an NN may store the results (e.g., Male/Female) as shown by results 271 and may generate and store associated scores as shown by scores 270.

A set of results 271 may be selected based on their associated scores 270. For example, assuming a score 270 can be in the range of zero to one (0-1), a threshold of 0.78 may be set and the set of results for which the score is higher than 0.78 may be selected. If the number of results for which the score is less than a threshold (e.g., 0.78) is less than a threshold (e.g., 4,000 results) then an embodiment may perform a subsequent or additional training iteration, run or cycle, possibly using additional recorded calls 222 or otherwise increase the number of results with scores above a threshold. For example, an embodiment may start with an initial set of 50,000 recorded calls 222 and perform training iterations until a gender-wise balanced set of 4,000 results with scores higher than 0.78 can be selected from results and scores recorded as shown by block 330.

The set selected based on scores may be examined in order to determine the ratio between male and female callers. If the ratio of male to female calls is greater than a threshold, e.g., greater than 0.52 then the set may be modified or enriched, e.g., by performing an additional, subsequent training run, iteration or cycle or by starting with a larger initial set. For example, an embodiment may perform training iterations until a set of 4,000 results with scores higher than 0.78 and where the set does not include more than 2,080 male related calls and no more than 2,080 female related calls.

For example, a set of results with a ratio of 0.5 of male to female callers is considered a purely gender-wise balanced set since half of the callers in such set are females and half are males. In some embodiments, a ratio threshold used may be a range, e.g., 0.48 to 0.52 which implies that nearly half of the callers (48% to 52%) are males, and the other half are females. Of course, the smaller the range the more balanced the set, therefore, the ratio threshold may be adjusted based on user requirements, time constraints and the like. Similarly, the number of iterations of selecting high scored result sets, balancing the sets with respect to callers' gender and using the set as labeled data for a subsequent training or retraining run may be governed by thresholds, e.g. the process may continue until a balanced set of results with scores above a threshold includes a predefined threshold or number of results. For example, an iterative training process may be performed until a gender-wise balanced set of 2,000 results all of which associated with a score higher than 0.89 is achieved.

To numerically illustrate, an embodiment may start a training session with a set of 50,000 recorded calls 222 and discover, following a first iteration and as shown by block 335 that the number of results with a score higher than 0.78 is less than 10,000, in such case, an embodiment may select (as shown by block 340) a subset of 40,000 results, e.g., with a score higher than 0.63 or restart the training session with a set larger than 50,000. Following a number of iterations, an embodiment may discover (e.g., as shown in block 335) that 10,000 or more results are associated with a score higher than 0.78. As shown by block 340, an embodiment may select, from the set of 10,000 results, a subset of 3,000 results in which the caller is a male and 3,000 results with a female caller and perform another training iteration using the selected subset as labeled data. One or more such iterations may be carried until, as shown by block 335, it is determined that, for a set of 3,000 calls in which nearly half of the callers (e.g., 48% to 52%) are males, GDU 230 correctly identifies the caller's gender, with a confidence level of 0.78 or higher.

Accordingly, some embodiments of the invention may generate a gender-wise balanced model 272 that can (or can be used by GDU 230 to) accurately determine the gender of a caller, with a score (or confidence level) higher than a threshold (e.g., higher than 0.78) for a set including at least a threshold number of recorded calls (e.g., 2,000) where the ratio of male to female callers in the set is within a predefined range (e.g., 0.48-0.52).

In some embodiments, model 272 may be generated or updated based on recorded interactions of a specific site. For example, model 272 may be specifically tailored for a specific customer or site. For example, assuming recorded calls 222 are of (made to) a specific call center or bank, training an NN using recorded calls 222 produces a model 272 which is specifically trained using calls received by the specific call center or bank, accordingly, model 272 may be specifically adapted to correctly handle aspects such as accent of callers, vocabulary used and specific issues discussed.

Some embodiment may determine or select how or by what method to handle an incoming call based at least in part on the gender determined by GDU 230. For example, if it is desired, e.g., by a call center, that female agents will respond to female callers then, using the gender determined by GDU 230, some embodiments may route calls from females to female agents. In another example, a call center may play recorded messages to callers who are on hold, such messages may be gender specific, e.g., if GDU 230 determined that the caller is a male then advertising content for men may be provided.

It will be noted that, since gender determination by GDU 230 may be done in realtime, immediately after a call is received, routing a call based on the gender of the caller can be done in realtime, immediately after a call is received without the need to retrieve any additional information related to the caller. In order to determine the gender of a caller, current systems need to retrieve caller information, a process that is costly in time, accordingly, by realtime gender determination, embodiments further improve the technological fields mentioned above.

The term "realtime" (also known and referred to in the art as "real-time", or "real time") as referred to herein generally relates to processing or handling of events at the rate or pace that the events occur or are received (possibly defined by human perception). For example, a system according to embodiments of the invention may determine a gender in real-time, e.g., within milliseconds or other very brief periods so that gender determination is done or made available virtually immediately.

In some embodiments, watchlists 260 may include, or include pointers to, voiceprints of untrustworthy callers. For example, voiceprints of hackers may be included in, or referenced from, a watchlist 260 such that additional verification that caller 206 (who was found in a watchlist 260) is indeed the (known) hacker or attacker as listed in watchlist 260. For example, additional verification, on top, or in addition to, finding caller 206 in a watchlist 260 may include matching a voiceprint of caller 206 with a voiceprint included in watchlist 260. For example, such additional verification may prevent erroneously identifying an innocent caller as an attacker.

Some embodiments may calculate a confidence level, e.g., a score 270, for a determination (e.g., a result 271) of a gender of a caller, and, if the confidence level or score is lower or less than a threshold then some embodiments may search for the caller in two or more watchlists, e.g., in both male and female watchlists 260 or in all watchlists 260. If the confidence level or score is lower or less than a threshold then some embodiments may further update model 272, e.g., by training or retraining an NN as described.

For example, GDU 230 may produce a result 271 (e.g., caller 206 is a female) and associate the result with a score 270 (e.g., 0.68). Based on one or more score-thresholds, e.g., by relating/matching score 270 to/with one or more score-thresholds, GDU 230 may select one or more courses or action. For example, a first (low) score-threshold may be 0.5 and a second (high) score-threshold may be 0.75.

In some embodiments, if score 270 is lower than the low score-threshold (e.g., less than 0.5) then GDU 230 may determine its gender determination cannot be trusted and may, instead of searching one gender specific watchlist 260, search some or all watchlists 260 and pass processing of the call to VBE 240. If score 270 is higher or greater than the first (low) score-threshold and lower, or is less than, the second (high) score-threshold (e.g., 0.75) then GDU 230 may check one gender specific watchlist 260, check the gender in caller data 273 and may indicate (e.g., to VBE 240) whether or not the determined caller's gender matches the gender in caller data 273. If score 270 is higher or greater than the second (high) score-threshold then GDU 230 may check one gender specific watchlist 260, may check the gender in caller data 273 and, if a match is found, GDU 230 may bypass VBE 240 and produce verification result 290 indicating the caller is authenticated. It will be understood that any number of score-thresholds may be used and any logic or flow may be defined or configured, e.g., such that validation of calling entities is made stricter or looser, faster or slower, involving VBE 240 or bypassing VBE 240 and so on.

In some embodiments, verification result 290 may be generated or provided based on a combination of results or outputs of GDU 230 and of VBE 240. For example, in some embodiments, to apply strict authentication, verification result 290 may be set to "caller authenticated" only if GDU 230 determines a gender match as described and VBE 240 determines a match (e.g., a voiceprint match). In some embodiments, to apply less strict authentication, gender matching may be done and some details in caller data 273 may be checked in order to determine the caller is authenticated, in yet looser configuration, gender matching by GDU 230 as described may suffice in order to determine caller 206 is authenticated. The configurations and flows described may be further enhanced using score-thresholds as described. Of course, all flows or configurations may include checking watchlists 260 as described.

Figure 4:
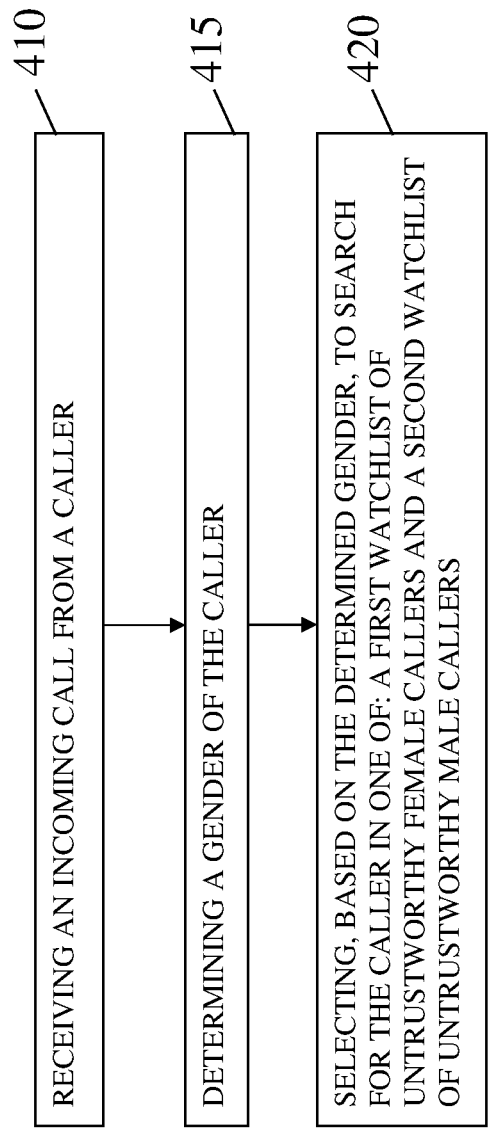
FIG. 4 shows a flowchart of a method according to illustrative embodiments of the present invention.

Reference is made to FIG. 4, a flowchart of a method according to illustrative embodiments of the present invention. As shown by block 410 an incoming call may be received from a caller. For example, recording unit 210 may receive a call from caller 206 as shown by arrow 282 and may forward the call to GDU 230. As shown by block 415, the gender of the caller may be determined, e.g., by GDU 230 as described. As shown by block 420, one of first and second watchlists may be selected for searching based on the determined gender of the caller. For example, based on the gender of caller 206, as determined by GDU 230, either a watchlist of male attackers or hackers may be searched (e.g., if GDU 230 determined caller 206 is a male) or a watchlist of female attackers or hackers may be searched, e.g., if GDU 230 determined caller 206 is a female.

Embodiments of the invention improve the technological, computerized fields of security and authentication, identification, and validation of entities, and more specifically, with respect to call centers, by a number of ways. For example, by reducing the size of watchlists in which hackers are searched (e.g., by half), embodiments of the invention improve speed with which a system identifies an attack as well as the speed with which a system authenticates a caller. In another example, by bypassing a VB engine, e.g., authenticating a caller based on gender, embodiments of the invention greatly improve the speed with which callers are authenticated.

In the detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order in time or to a chronological sequence. Additionally, some of the described method elements can occur, or be performed, simultaneously, at the same point in time, or concurrently. Some of the described method elements may be skipped, or they may be repeated, during a sequence of operations of a method. In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to a person having ordinary skill in the art. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of identifying an attempted fraud, the method comprising:
   receiving an incoming call from a caller;
   determining a gender of the caller;
      wherein determining the gender of the caller is done by a unit including a model, the model created by:
         training a neural network (NN) using an initial set of labeled data and recording results and associated confidence levels produced by the NN;
         selecting, as labeled data, a set of results such that:
            a ratio of the number of results related to females to the number of results related to males is within a predefined range, and
            a majority of confidence levels respectfully associated with a majority of the results in the set are higher than a threshold; and
         retraining the NN using the selected set;
   selecting, based on the determined gender, to search for the caller in one of: a first watchlist of untrustworthy female callers and a second watchlist of untrustworthy male callers;
   calculating a confidence level for the determination of the gender of the caller; and
   if the confidence level is lower than a threshold then performing at least one of:
      searching for the caller in the first and second lists; and
      updating a model.

2. The method of claim 1, comprising: if the caller is found in one of the first and second watchlists then performing at least one action related to fraud detection.

3. The method of claim 1, comprising:
   associating a gender of a caller with each of a plurality of recorded interactions;
   determining a gender of an untrustworthy caller; and
   selecting, based on the determined gender of the untrustworthy caller, to search for the untrustworthy caller in recorded interactions in which the gender of the caller is same as the gender of the untrustworthy caller.

4. The method of claim 3, comprising: upon identifying the untrustworthy caller in one of the recorded interactions, performing at least one action related to fraud detection.

5. The method of claim 1, comprising:
   associating a gender of a caller with each of a plurality of recorded interactions; and
   clustering at least some of the recorded interactions by examining recorded interactions associated with a specific gender.

6. The method of claim 5, wherein the plurality of recorded interactions includes interactions suspected to be related to fraud.

7. The method of claim 1, comprising verifying the caller based on matching the determined gender to the gender in a retrieved caller data.

8. The method of claim 1, comprising iteratively selecting a set of results as labeled data and retraining the NN until the number of results in the selected set meets at least one criterion.

9. The method of claim 1, wherein the model is generated or updated based on recorded interactions of a specific site.

10. The method of claim 1, comprising determining how to handle the incoming call based on the determined gender.

11. The method of claim 1, wherein searching for the caller in one of the first and second watchlists includes matching a voiceprint of the caller with voiceprints of the callers in the watchlist.

12. A method of authenticating a caller, the method comprising:
   identifying the gender of the caller;
      wherein identifying the gender of the caller is done by a unit including a model, the model created by:
         training a neural network (NN) using an initial set of labeled data and recording results and associated confidence levels produced by the NN;
         selecting, as labeled data, a set of results such that:
            a ratio of the number of results related to females to the number of results related to males is within a predefined range, and
            a majority of confidence levels respectfully associated with a majority of the results in the set are higher than a threshold; and
         retraining the NN using the selected set:
   if the caller is a male, then searching for the caller in a first list of untrustworthy male callers;
   if the caller is a female then searching for the caller in a second list of untrustworthy female callers;
   calculating a confidence level for the determination of the gender of the caller;
   if the confidence level is lower than a threshold then performing at least one of:
      searching for the caller in the first and second lists; and
      updating a model; and
   if the caller is found in one of the lists, then performing at least one action related to security.

13. A system comprising:
   a memory; and
   a controller configured to:
      receive an incoming call from a caller;
      determine a gender of the caller;
         wherein determining the gender of the caller is done by a unit including a model, the model created by:
            training a neural network (NN) using an initial set of labeled data and recording results and associated confidence levels produced by the NN;
            selecting, as labeled data, a set of results such that:
               a ratio of the number of results related to females to the number of results related to males is within a predefined range, and
               a majority of confidence levels respectfully associated with a majority of the results in the set are higher than a threshold; and
            retraining the NN using the selected set;
      select, based on the determined gender, to search for the caller in one of: a first watchlist of untrustworthy female callers and a second watchlist of untrustworthy male callers;
      calculate a confidence level for the determination of the gender of the caller; and
      if the confidence level is lower than a threshold then perform at least one of:
         search for the caller in the first and second lists; and update a model.

14. The system of claim 13, wherein the controller is further configured to: if the caller is found in one of the first and second watchlists then perform at least one action related to fraud detection.

15. The system of claim 13, wherein the controller is further configured to:
associate a gender of a caller with each of a plurality of recorded interactions;
determine a gender of an untrustworthy caller; and
select, based on the determined gender of the untrustworthy caller, to search for the untrustworthy caller in recorded interactions in which the gender of the caller is same as the gender of the untrustworthy caller.

16. The system of claim 13, wherein the controller is further configured to:
associate a gender of a caller with each of a plurality of recorded interactions; and
cluster at least some of the recorded interactions by examining recorded interactions associated with a specific gender.

17. The system of claim 13, wherein the controller is configured to determine the gender of the caller using the model, the model created by:
training a neural network (NN) using an initial set of labeled data and recording results and associated confidence levels produced by the NN;
selecting, as labeled data, a set of results such that:
a ratio of the number of results related to females to the number of results related to males is within a predefined range, and
a majority of confidence levels respectfully associated with a majority of the results in the set are higher than a threshold; and
retraining the NN using the selected set.

18. The system of claim 13, wherein the controller is configured to determine how to handle the incoming call based on the determined gender.

19. A method of identifying an attempted fraud, the method comprising:
receiving an incoming call from a caller;
determining a gender of the caller; wherein
the gender of the caller is determined by a unit including a model created by:
training a neural network (NN) using an initial set of labeled data and recording results and associated confidence levels produced by the NN;
selecting, as labeled data, a set of results such that:
a ratio of the number of results related to females to the number of results related to males is within a predefined range, and
a majority of confidence levels respectfully associated with a majority of the results in the set are higher than a threshold; and
retraining the NN using the selected set; and
selecting, based on the determined gender, to search for the caller in one of: a first watchlist of untrustworthy female callers and a second watchlist of untrustworthy male callers.

\* \* \* \* \*